United States Patent
Przygienda et al.

(10) Patent No.: US 9,749,220 B2
(45) Date of Patent: Aug. 29, 2017

(54) AUTOMATED DETERMINATION OF TREE ATTRIBUTES AND ASSIGNMENT OF RECEIVER IDENTIFIERS BY DISTRIBUTED ELECTION IN MULTICAST ARCHITECTURES RELYING ON PACKETS IDENTIFYING INTENDED RECEIVERS

(71) Applicant: Telefonaktiebolaget L M Ericsson (publ), Stockholm (SE)

(72) Inventors: Antoni Przygienda, Sunnyvale, CA (US); Evgeny Tantsura, Palo Alto, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 189 days.

(21) Appl. No.: 14/579,575

(22) Filed: Dec. 22, 2014

(65) Prior Publication Data

US 2016/0087890 A1   Mar. 24, 2016

Related U.S. Application Data

(60) Provisional application No. 62/053,067, filed on Sep. 19, 2014.

(51) Int. Cl.
*H04L 12/54* (2013.01)
*H04L 12/707* (2013.01)
(Continued)

(52) U.S. Cl.
CPC ............ *H04L 45/16* (2013.01); *H04L 45/24* (2013.01); *H04L 45/60* (2013.01); *H04L 45/74* (2013.01); *H04L 45/741* (2013.01)

(58) Field of Classification Search
None
See application file for complete search history.

(56) References Cited

U.S. PATENT DOCUMENTS

| | | | |
|---|---|---|---|
| 6,266,706 B1 * | 7/2001 | Brodnik ................. | H04L 45/00 370/238 |
| 6,874,033 B1 * | 3/2005 | Sugai .................... | H04L 45/742 398/49 |

(Continued)

OTHER PUBLICATIONS

RFC 1142: Oran, D., "OSI ISIS Intradomain Routing Protocol", *Network Working Group*, (Feb. 1990), 157 pages.

(Continued)

*Primary Examiner* — Alpus H Hsu
(74) *Attorney, Agent, or Firm* — Nicholson De Vos Webster & Elliott LLP

(57) ABSTRACT

Exemplary methods include a first network device participating in an election process to determine a designated bit forwarding router (D-BFR). The methods include in response to determining the first network device is elected to be the D-BFR, performing D-BFR operations comprising determining an elected bitmask (BM) length of a BM based on maximum local BM lengths advertised by other BFRs in the network, wherein each bit of the BM will correspond to a bit forwarding egress router (BFER), and advertising the determined elected BM length to other BFRs. The methods may further include one or more of determining an elected tree type based on supported tree types advertised by other BFRs in the network, assigning one or more BM positions (BMPs) to one or more BFERs, and advertising the elected determined tree type and/or the assigned one or more BMPs.

9 Claims, 9 Drawing Sheets

(51) Int. Cl.
*H04L 12/773* (2013.01)
*H04L 12/761* (2013.01)
*H04L 12/749* (2013.01)
*H04L 12/741* (2013.01)

(56) References Cited

U.S. PATENT DOCUMENTS

| | | | |
|---|---|---|---|
| 7,260,096 B2* | 8/2007 | Basso | H04L 45/00 370/392 |
| 7,551,551 B2* | 6/2009 | Filsfils | H04L 45/02 370/219 |
| 9,319,312 B2* | 4/2016 | Filsfils | H04L 45/507 |
| 2007/0016637 A1* | 1/2007 | Brawn | H04L 47/2441 709/200 |
| 2014/0086255 A1 | 3/2014 | Gooch et al. | |

OTHER PUBLICATIONS

RFC 2131: Droms, R., "Dynamic Host Configuration Protocol", retrieved from the Internet <tools.ietf.org/pdf/rfc2131.pdf>, (Mar. 1997), pp. 1-46.
RFC 2328: Moy, J., "OSPF Version 2", *Network Working Group, The Internet Society*, (Apr. 1998), 244 pages.
RFC 4601: Fenner, et al., "Protocol Independent Multicast—Sparse Mode (PIM—SM): Protocol Specification (Revised)", (Aug. 2006), pp. 1-158.
RFC 4915: Psenak, et al., "Multi-Topology (MT) Routing in OSPF", *IETF*, (Jun. 2007), 20 pages.
RFC 5250: Berger, et al., "The OSPF Opaque LSA Option", *Network Working Group*, (Jul. 2008), 17 pages.
RFC 6826: Wijnands, et al., "Multipoint LDP In-Band Signaling for Point-to-Multipoint and Multipoint-to-Multipoint Label Switched Paths", https://datatracker.ietf.org/doc/rfc6826/, *Internet Engineering Task Force (IETF)*, (Jan. 2013), 12 pages.
Ooms, et al., "Connectionless Multicast", *IETF Internet Draft* <draft-ooms-cl-multicast-02.txt>, (Apr. 2000), 24 pages.
Psenak, et al., "OSPFv2 Prefix/Link Attribute Advertisement", IETF draft-ietf-ospf-prefix-link-attr-00.txt, *Network Working Group Internet Draft*, (Aug. 12, 2014), 13 pages.
Rosen, et al., "BGP/MPLS IP VPNs", draft-ietf-l3vpn-rfc2547bis-03.txt, *Internet Engineering Task Force (IETF), Network Working Group, Internet Draft*, (Oct. 2004), 49 pages.
Sajassi, et al., "Requirements for Ethernet VPN (EVPN)", draft-ietf-l2vpn-evpn-req-07.txt, *Internet Working Group, IETF Trust*, (Feb. 4, 2014), 16 pages.
Wijnands, et al., "Multicast using Bit Index Explicit Replication", IETF draft-wijnands-bier-architecture-00, (Sep. 22, 2014), 24 pages.

* cited by examiner

300

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type               |           Length              |
+-+-+-+-+-+-+-+-+-+-+-+-+-+-+-+-+-+-+-+-+-+-+-+-+-+-+-+-+-+-+-+-+
|    MT-ID      |   Reserved    | # of following Set Elections  |
+-+-+-+-+-+-+-+-+-+-+-+-+-+-+-+-+-+-+-+-+-+-+-+-+-+-+-+-+-+-+-+-+
                                                                  <--+
+-+-+-+-+-+-+-+-+-+-+-+-+-+-+-+-+                                    |
|            Set ID             |                                    |
+-+-+-+-+-+-+-+-+-+-+-+-+-+-+-+-+-+-+-+-+-+-+-+-+-+-+-+-+-+-+-+-+    |
| D-BFR Priority|Supported Trees| Maximum Local BM Length       |  Set Info
+-+-+-+-+-+-+-+-+-+-+-+-+-+-+-+-+-+-+-+-+-+-+-+-+-+-+-+-+-+-+-+-+  Block
|                          D-BFR ID                             | (repeated
+-+-+-+-+-+-+-+-+-+-+-+-+-+-+-+-+-+-+-+-+-+-+-+-+-+-+-+-+-+-+-+-+ for each
|                         BD-BFR ID                             |  set)
+-+-+-+-+-+-+-+-+-+-+-+-+-+-+-+-+-+-+-+-+-+-+-+-+-+-+-+-+-+-+-+-+    |
                                                                  <---+
```

FIG. 3

BIER-PE: OSPVv2 BIER Protocol Election Opaque LSA

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |             Length             |
+-+-+-+-+-+-+-+-+-+-+-+-+-+-+-+-+-+-+-+-+-+-+-+-+-+-+-+-+-+-+-+-+
| Encap Type    |    MT-ID      |            Set ID              |
+-+-+-+-+-+-+-+-+-+-+-+-+-+-+-+-+-+-+-+-+-+-+-+-+-+-+-+-+-+-+-+-+
| Reserved      |                   Label                        |
+-+-+-+-+-+-+-+-+-+-+-+-+-+-+-+-+-+-+-+-+-+-+-+-+-+-+-+-+-+-+-+-+
|     Admin BM Position                         |A|R|   Rsrvd    |
+-+-+-+-+-+-+-+-+-+-+-+-+-+-+-+-+-+-+-+-+-+-+-+-+-+-+-+-+-+-+-+-+
```

FIG. 4

BIER-PI TLV

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Type              |            Length             |
+-+-+-+-+-+-+-+-+-+-+-+-+-+-+-+-+-+-+-+-+-+-+-+-+-+-+-+-+-+-+-+-+
|    MT-ID      |           Set ID              |Tree ID| Resvd |
+-+-+-+-+-+-+-+-+-+-+-+-+-+-+-+-+-+-+-+-+-+-+-+-+-+-+-+-+-+-+-+-+
| Elected BM Length             |  # of BM      Assigments      |
+-+-+-+-+-+-+-+-+-+-+-+-+-+-+-+-+-+-+-+-+-+-+-+-+-+-+-+-+-+-+-+-+
                                                                   <---+
+-+-+-+-+-+-+-+-+-+-+-+-+-+-+-+-+-+-+-+-+-+-+-+-+-+-+-+-+-+-+-+-+      |
|  Route Type   |      AF       | Prefix Length |    Status     |      |
+-+-+-+-+-+-+-+-+-+-+-+-+-+-+-+-+-+-+-+-+-+-+-+-+-+-+-+-+-+-+-+-+  BM position
| BM Position Assignment        |                                  assignment
+-+-+-+-+-+-+-+-+-+-+-+-+-+-+-+-+-+-+-+-+-+-+-+-+-+-+-+-+-+-+-+-+    block
|                   Address Prefix (variable)                   |  (repeated
+-+-+-+-+-+-+-+-+-+-+-+-+-+-+-+-+-+-+-+-+-+-+-+-+-+-+-+-+-+-+-+-+  for each
|                           BFER ID                             |    BMP)
+-+-+-+-+-+-+-+-+-+-+-+-+-+-+-+-+-+-+-+-+-+-+-+-+-+-+-+-+-+-+-+-+      |
                                                                   <---+
```

FIG. 5

BIER-PE-BMP: BIER PE BMP Assignments Opaque LSA

United States Patent

AUTOMATED DETERMINATION OF TREE ATTRIBUTES AND ASSIGNMENT OF RECEIVER IDENTIFIERS BY DISTRIBUTED ELECTION IN MULTICAST ARCHITECTURES RELYING ON PACKETS IDENTIFYING INTENDED RECEIVERS

CROSS-REFERENCE TO RELATED APPLICATIONS

This application claims the benefit of U.S. Provisional Application No. 62/053,067, filed Sep. 19, 2014, which is hereby incorporated by reference.

FIELD

Embodiments of the invention relate to the field of packet networks; and more specifically, to the automated election and distribution of bitmask (BM) length, BM position, and tree type information.

BACKGROUND

The Internet Engineering Task Force (IETF) Internet Draft (I-D) draft-wijnands-bier-architecture-00 (which is hereby incorporated by reference) describes Bit Index Explicit Replication (BIER) as an architecture where all intended multicast receivers are encoded as a bit in a bitmask (BM), i.e., each receiver is represented by a unique bit in the BM. A router that receives a packet with the bitmask encapsulated in the header will forward the packet based on the setting of the BM towards the receiver(s), following a pre-computed tree for each of the bits in the BM.

Due to the restricted number of bits a header can carry and the scalability concerns that this raises, BIER supports the concept of receiver sets. Each packet carries a BIER set, wherein each set is identified by a unique set identifier. Usage of several of those sets can be understood as either spanning a single BIER tree encompassing all receivers in all BIER sets (linear extension of a single distribution transport) or as multiple independent sets of BIER sets (each of those being an independent multicast distribution transport).

Once the number of receivers becomes large (i.e., many sets are present) or receivers participate in many independent BIER trees (i.e., a receiver can be assigned many independent bits in many sets), assignment of a unique BM position (BMP) to a receiver is a non-trivial problem that requires an automated solution. The usual trade-offs are either a centralized (server) approach or a distributed approach which provides, at the cost of additional protocol complexity, higher scalability. Additionally, it is necessary to ensure that all receivers sharing sets must be able to support a type of tree being used to distribute the packet and the BM length of each set.

SUMMARY

Exemplary methods performed by a first network device that is communicatively coupled to a plurality of other network devices in a network, wherein each of the network devices is a bit forwarding router (BFR), includes participating in an election process to determine a designated BFR (D-BFR). The methods further include in response to determining the first network device is elected to be the D-BFR, performing D-BFR operations comprising determining an elected BM length of a BM based on maximum local BM lengths advertised by other BFRs in the network, wherein each bit of the BM will correspond to a bit forwarding egress router (BFER), and advertising the determined elected BM length to the other BFRs.

According to one embodiment, performing D-BFR operations further comprises determining an elected tree type based on supported tree types advertised by other BFRs in the network, and advertising the determined elected tree type to the other BFRs. In one embodiment, performing D-BFR operations further comprises assigning one or more BM positions (BMPs), each of the one or more BMPs assigned to a different BFER, and advertising the assigned one or more BMPs to the other BFRs.

In one embodiment, determining the elected BM length comprises receiving a message from one or more of the other BFRs, each message including a maximum BM length supported by a BFR that sent the message, determining a minimum BM length of all the maximum BM lengths included in a received message, and in response to determining the minimum BM length is not shorter than a previously elected BM length, setting the elected BM length to be equal to the determined minimum BM length.

In one embodiment, determining the elected BM length comprises receiving a message from one or more of the other BFRs, each message including a maximum BM length supported by a BFR that sent the message, determining a minimum BM length of all the maximum BM lengths included in a received message, and in response to determining the minimum BM length is shorter than a previously elected BM length, setting the elected BM length to be equal to the previously elected BM length.

According to one embodiment, determining the elected tree type comprises receiving a message from one or more of the other BFRs, each message including an indication of one or more tree types supported by a BFR that sent the message, determining a tree type that is indicated as supported by one or more BFRs that sent a message, and setting the elected tree type to be the determined tree type that is indicated as supported by one or more BFRs that sent a message.

In one embodiment, assigning one or more BMPs comprises receiving a message from a BFER, the message indicating a request for a BMP to be assigned to the BFER, assigning a BMP to the BFER, and updating BMP information to indicate the BMP has been assigned so that the BMP will not be assigned to another BFER. In one embodiment, the message from the BFER further indicates a particular BMP that the BFER prefers. In one embodiment, the message from the BFER further indicates that the BFER is willing to accept a BMP other than the particular BMP that the BFER prefers.

BRIEF DESCRIPTION OF THE DRAWINGS

The invention may best be understood by referring to the following description and accompanying drawings that are used to illustrate embodiments of the invention. In the drawings:

FIG. 3 is a block diagram illustrating a BIER protocol election (BIER-PE) packet according to one embodiment.

FIG. 4 is a block diagram illustrating a BIER prefix information type length value (BIER-PI TLV) packet according to one embodiment.

FIG. 5 is a block diagram illustrating a BIER protocol election BM position (BIER-PE-BMP) packet according to one embodiment.

DESCRIPTION OF EMBODIMENTS

Figure 1:
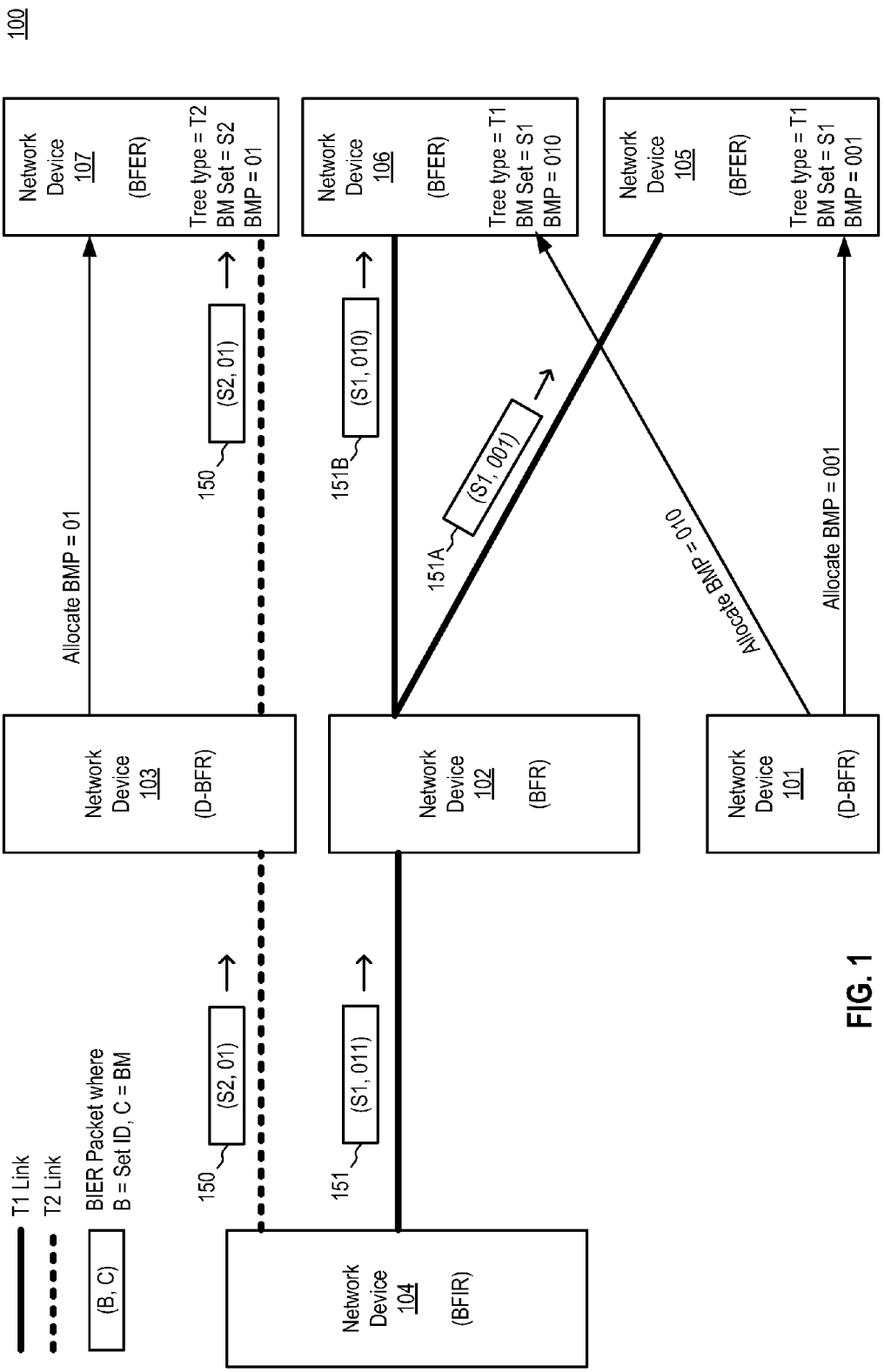
FIG. 1 is a block diagram illustrating a network for supporting BIER according to one embodiment.

The following description describes methods and apparatuses for distributing BIER information. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device or a computing device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a block diagram illustrating network 100 for supporting the BIER protocol in a topology. As used herein, a topology refers to an arrangement of various network elements (e.g., links, nodes, etc.) of a network. A topology comprises one or more trees. As used herein, a tree refers to an arrangement of network elements in such a manner that it is loop free, i.e., there is no path which starts and ends at the same node. Here, a path refers to a set of links that couple the network devices.

In the illustrated example, network 100 includes network devices 101-102 communicatively coupled to network devices 105-106. Network device 102 is further communicatively coupled to network device 104. Network device 103 is communicatively coupled to network devices 104 and 107. In this example, network devices 102 and 104-106 are communicatively coupled by tree T1, through links indicated by solid lines in FIG. 1. Further, network devices 103-104 and 107 are communicatively coupled by tree T2, through links indicated by dashed lines in FIG. 1.

Each of the illustrated network devices is a bit forwarding router (BFR). As used herein, a BFR is a network device that supports the BIER protocol (i.e., a BIER-enabled network device). A BFR can be a bit forwarding ingress router (BFIR). As used herein, a BFIR is an ingress router that inserts/encapsulates a BM onto a packet before sending the packet to the next BFR(s) towards the intended receivers. A BFR can be bit forwarding egress router (BFER). As used herein, a BFER is an egress router that has been assigned a BMP, and which is configured to receive BIER packets with its BMP set. In this example, network device 104 is a BFIR, and network devices 105-107 are BFERs.

A BFR can be elected to be a designated BFR (D-BFR) and/or a backup D-BFR (BD-BFR) for a set. A network device may serve as a D-BFR or BD-BFR for one or more sets. In the illustrated example, network device 101 has been elected as the D-BFR for set S1, and network device 103 has been elected to be the D-BFR for set S2. In order to avoid obscuring the invention, the BD-BFRs have been omitted from the illustration. According to one embodiment, a D-BFR is configured to determine a BM length for each BM (i.e., set). In this example, set S1 has a length of 3 bits, and set S2 has a length of 2 bits. Throughout the description, the rightmost bit shall be referred to as the "first bit", the second rightmost bit shall be referred to as the "second bit", and so on.

According to one embodiment, a D-BFR is further configured to assign to each BFER a BMP that is unique within the BM set. In this example, network devices 105-106 have been assigned BMPs 001 and 010 of BM set S1, respectively. Further, network device 107 has been assigned the BMP 01 of BM set S2. Thus, a BFR that receives a multicast packet can determine the destination(s) of the packet based on the BM settings. By way of example, suppose network device 104 (i.e., the BFIR) needs to send packet 150 to network device 107 (i.e., the BFER). In such a case, network device 104 would inject packet (S2, 01) 150 into the network. Throughout the description, a BIER packet shall be described as "packet (B, C)" wherein "B" represents the set ID, and "C" represents a BM. It shall be understood that "B, C" are encapsulated onto the packet using an encapsulation protocol (e.g., MPLS) negotiated and agreed upon by the BFRs. One having ordinary skill would recognize that although not shown, other information can be included as part of the packet (e.g., payload, checksums, etc.).

Continuing on with the above example, packet (S2, 01) 150 is received by network device 103. Network device 103 determines that the first bit of the encapsulated BM is set, and that network device 107 has a BMP of 01 (i.e., the first bit position). In response to such a determination, network device 103 directs packet (S2, 01) 150 towards network device 107 via tree T2. Throughout the description, a BM bit that is set to "1" indicates the packet should be forwarded to the BFER with the corresponding BMP. It shall be understood, however, that other conventions can be used.

By way of further example, suppose network device 104 needs to send packet 151 to both network devices 105 and 106. In such an instance, network device 104 would inject packet (S1, 011) 151 into the network. Packet (S1, 011) 151 is received by network device 102. Network device 102 determines that the first bit of the encapsulated BM is set, and that network device 105 has a BMP of 001 (i.e., the first bit position). In response to such a determination, network device 102 modifies the BM and directs the packet towards network device 105 via tree T1. For example, network device 102 sends packet (S1, 011) 151 as packet (S1, 001) 151A to network device 105.

Network device 102 further determines that the second bit of the encapsulated BM is set, and that network device 106 has a BMP of 010 (i.e., the second bit position). In response to such a determination, network device 102 replicates packet (S1, 011) 151 and modifies its BM and directs it towards network device 106. For example, network device 102 sends packet (S1, 011) 151 as packet (S1, 010) 151B to network device 106.

According to one embodiment, a D-BFR is configured to elect a tree type that all participating BFRs must compute and use to transmit BIER packets. A D-BFR, in one embodiment, elects a tree type based on the tree types that are supported by the BFRs, and/or based on administrative configuration, described in further details below.

Figure 2:
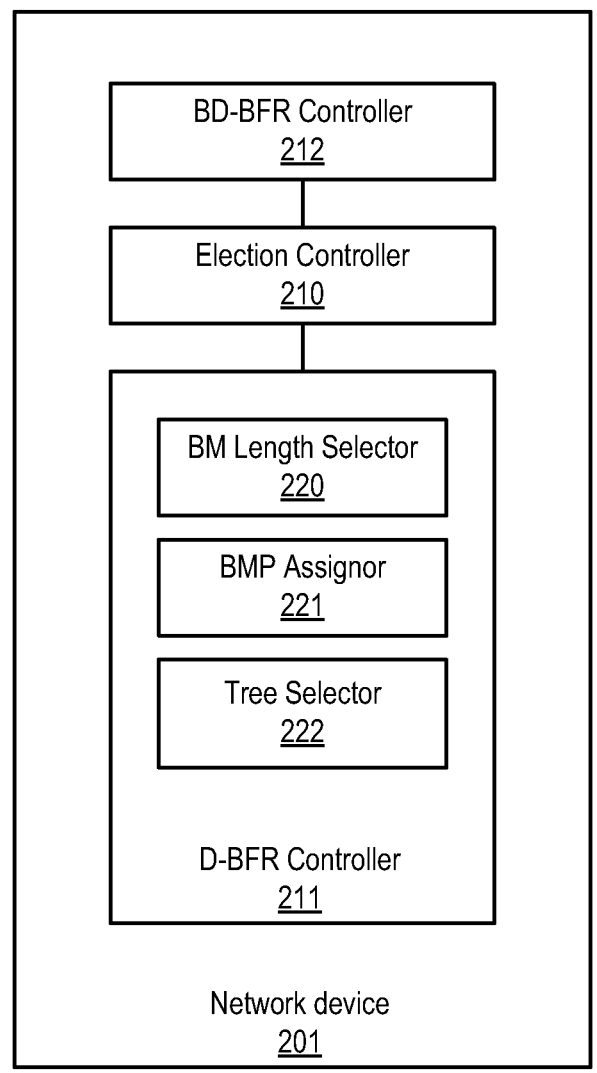
FIG. 2 is a block diagram illustrating a network device for supporting BIER according to one embodiment.

FIG. 2 is a block diagram illustrating network device 201 according to one embodiment. According to one embodiment, network device 201 includes election controller 210, responsible for performing an election algorithm/process to elect a D-BFR and a BD-BFR. Election controller 210 may be implemented as software, firmware, hardware, or any combination thereof. According to one embodiment, a given set S in topology T (denoted as <T,S>) is not enabled for election purposes unless triggered by a first BIER-PE packet or BIER-PI TLV packet containing the set S being advertised into the topology. It shall be understood, however, that <T,S> can be enabled using any other mechanism, including but not limited to, a configuration by an administrator. As used herein, a BIER-PE packet is a protocol packet unit (PPU) that carries protocol election information for BIER. For example, in the case of Open Shortest Path First, Version 2 (OSPFv2), a BIER-PE packet is an Opaque Link State Advertisement (LSA), which is described in the IETF Request For Comments (RFC) 5250 (hereby incorporated by reference). As used herein, a BIER-PI TLV packet is a PPU that carries the BIER Prefix Information of a BFER. For example, in the case of OSPFv2, a BIER-PI TLV packet is an Extended Prefix Opaque LSA, which is described in the IETF I-D draft-ietf-ospf-prefix-link-attr-00 (hereby incorporated by reference). The first BIER-PE or BIER-PI TLV may be triggered by any of various events, including but not limited to, a Virtual Private Network (VPN) desiring to initiate a Point-to-Multipoint (P2MP) tree or a BMP being administratively assigned to a BFER and advertised via BIER-PI TLV into the area.

Once the set S is enabled, election controller 210 is configured to participate in an election process to elect a D-BFR for <T,S> (herein denoted as D-BFR<T,S>), and a BD-BFR for <T,S> (herein denoted as BD-BFR<T,S>). The election algorithm shall now be described.

Election Initialization

Election controller 210 generates a list of BFRs participating in <T,S>. It is to be noted that network device 201 itself must be included on the list. The list must include only BFRs which are reachable by network device 201, and must not include BFRs that are not eligible to become a D-BFR (e.g., a BFR with a router priority of 0 for <T,S>). For example, the list may include BFRs which have advertised their BIER election information by sending BIER-PE packets that were received by network device 201.

FIG. 3 is a block diagram illustrating BIER-PE packet 300 according to one embodiment. The information/elements shown as part of BIER-PE packet 300 are for illustrative purposes, and are not intended to be limitations of the present invention.

According to one embodiment, BIER-PE packet 300 is implemented as an OSPFv2 opaque LSA, which is described in IETF RFC 5250. BIER-PE packet 300 is advertised/distributed by each BFR participating in BIER and contains one or more of the set info blocks illustrated in FIG. 3. The set info block is repeated for each set that the sending BFR participates in. BIER-PE packet 300 includes, but is not limited to, the following fields:

| Field | Definition |
| --- | --- |
| Type | A predefined value identifying the packet as a BIER-PE. |

| Field | Definition |
| --- | --- |
| Length | The total length of the packet. |
| MT-ID | Multi-Topology Identifier, described in IETF RFC 4915 (herein incorporated by reference). |
| # Of Set Elections | The number of set info blocks that are repeated in this packet. |
| Set ID | The set identifier. |
| D-BFR Priority | The priority for <MT-ID, Set ID> of the BFR which sent this packet (used for D-BFR and BD-BFR election purposes). |
| Supported Tree Types | The mask of optional tree types supported by the BFR which sent this packet. |
| Maximum Local BM Length | The maximum BM length supported by the BFR which sent this packet. |
| D-BFR ID | The router ID of the BFR that has been elected as the D-BFR. If the sending BFR elected itself as the D-BFR, it must set this field to its own router ID. |
| BD-BFR ID | The router ID of the BFR that has been elected as the BD-BFR. If the sending BFR elected itself as the BD-BFR, it must set this field to its own router ID. |

BD-BFR Election Algorithm

Referring now back to FIG. 2, election controller 210 performs the following operations to elect a BD-BFR<T,S>. Election controller 210 removes all BFRs that have advertised themselves to be D-BFRs<T,S> from the generated list of BFRs. From the BFRs remaining on the pruned generated list, election controller 210 determines if one or more BFRs have advertised themselves to be BD-BFRs<T,S>. If so, election controller 210 elects the one with the highest router priority for <T,S> to be the BD-BFR<T,S>.

In the event of a tie in router priority of two or more of the BFRs advertising to be BD-BFRs<T,S>, the BFR having the highest router ID XOR'ed with S (e.g., the set ID) (assuming big endian order, both values right-aligned and all bits of the shorter value padded with zeroes to the length of the longer value) is elected as the BD-BFR<T,S>. The mechanisms for distributing the router IDs is well known in the art, and for the sake of brevity, will not be described here.

If no BFRs have advertised/declared themselves to be BD-BFR for <T,S>, election controller 210 elects the BFR having the highest router priority for <T,S> as the BD-BFR<T,S>. In the event of a tie in router priority of two or more of the BFRs, the BFR having the highest router ID XOR'ed with S is elected as the BD-BFR<T,S>.

D-BFR Election Algorithm

Election controller 210 performs the following operations to elect a D-BFR<T,S>. Election controller 210 determines whether one or more BFRs on the list generated as part of the initialization process have advertised themselves as D-BFRs<T,S> (e.g., by sending BIER-PE packets). If so, the one having the highest router priority for <T,S> is elected to be the D-BFR <T,S>. In the event of a tie in router priority of two or more of the BFRs, the one having the highest router ID XOR'ed with S is elected. If no BFRs have declared themselves D-BFR<T,S>, election controller 210 elects the newly elected BD-BFR<T,S> as the D-BFR<T,S>.

In response to determining network device 201 is (i) a newly elected D-BFR<T,S>, (ii) a newly elected BD-BFR<T,S>, (iii) no longer the D-BFR<T,S>, or (iv) no longer the BD-BFR<T,S>, election controller 210 re-performs the BD-BFR election algorithm and the D-BFR election algorithm. For example, if network device 201 is a newly elected D-BFR<T,S>, when the BD-BFR algorithm is re-performed, network device 201 will no longer be eligible for BD-BFR<T,S> election. Among other things, this will ensure that no BFR will declare itself both BD-BFR<T,S> and D-BFR<T,S>.

The reason behind the election algorithm's complexity is the desire for an orderly transition from BD-BFR<T,S> to D-BFR<T,S>, when the current D-BFR<T,S> fails. This orderly transition is ensured through the introduction of hysteresis: no new BD-BFR<T,S> can be chosen until the old BD-BFR<T,S> accepts its new D-BFR<T,S> responsibilities.

The above procedure may elect the same BFR to be both the D-BFR<T,S> and the BD-BFR<T,S>. For example, network device 201 may elect itself as the D-BFR<T,S>, but due to the timing of when BIER-PEs are received by other BFRs, those other BFRs may elect network device 201 as the BD-BFR<T,S>. It is to be further noted that the elected D-BFR<T,S> may not be the BFR having the highest router priority for <T,S>, nor will the BD-BFR<T,S> necessarily have the second highest router priority (again due to the timing of when BIER-PEs are received by the BFRs). It is to be noted also that if network device 201 is the only BFR that is eligible to become D-BFR<T,S>, it will elect itself as the D-BFR<T,S> and there will be no BD-BFR<T,S> for the network.

According to one embodiment, in response to determining that network device 201 is the elected D-BFR<T,S>, election controller 210 enables D-BFR controller 211 to perform D-BFR responsibilities. D-BFR controller 211 may be implemented as software, firmware, hardware, or any combination thereof. In one embodiment, D-BFR controller 211 includes BM length selector 220 for electing a BM length for <T,S> (herein referred to as BM length<T,S>). To elect a BM length <T,S>, BM length selector 220 computes the minimum value of all maximum BM lengths advertised by all BFRs<T,S> via the BIER-PE packets. This computed minimum value is the determined minimum BM length.

According to one embodiment, BM length selector 220 does not elect a new BM length that is shorter than the previously elected BM length unless all participating BFRs (with possible exception of the D-BFR) in <T,S> advertise BM lengths that are shorter than or equal to the determined minimum BM length. This requirement is to ensure that no BFRs will be excluded from the BIER network because there are not enough BMPs.

BM length selector 220 may, however, elect a shorter BM length if it determines that the resulting tree is partitioned and not all BFRs with assigned BMPs can be reached unless the BFR(s) with the shorter BM length(s) are included in the election. In other words, if the BFR with a shorter BM length (i.e., the BFR that caused the determined minimum BM length to be shorter than the previously elected BM length) is needed in order for all BFRs to be reachable, then BM length selector 220 may elect the new BM length to be equal to the shorter BM length. In one embodiment, in response to determining the newly elected BM length is shorter than the previously elected BM length, BM length selector 220 causes BMP assignor 221 to reassign the BMPs. In one embodiment, BM length selector 220 then causes network device 201 to advertise the newly elected BM length in a BIER-PE-BMP packet, described in further details below.

According to one embodiment, D-BFR controller 211 further includes tree selector 222 for selecting a tree type that the BFRs are required to use for transmitting the BIER packets. According to one embodiment, each participating BFR advertises the tree types that it supports by sending a BIER-PE packet. In one embodiment, each BFR is required to support at least the Shortest Path First (SPF) tree type and/or the Shortest Spanning Tree (SST) type. Each BFR may, in addition, support one or more optional tree types. In response to receiving such advertisements, tree selector 222 stores or causes to be stored the information about the supported tree types in a storage device, e.g., a storage device accessible by network device 201. According to one embodiment, tree selector 222 sets the elected tree type to be a tree type that is supported by all BFRs. In one embodiment, in response to determining there are multiple tree types that can be supported by all the BFRs, tree selector 222 sets the elected tree type to be a default tree type (e.g., an administratively configured tree type) that is supported by all BFRs. In one embodiment, tree selector 222 sets the elected tree type to be an administratively configured tree type and excludes BFRs that do not support the elected tree type. For example, in this embodiment, in response to determining that not all BFRs support an optional tree type, tree selector 222 may nevertheless select the optional tree type even though this selection will result in some BFRs being excluded from the BIER network. The tree type election algorithms described here are for illustrative purposes. It shall be understood that tree selector 222 may elect any tree type based on administrative configuration and/or information concerning which tree types are supported by the BFRs. According to one embodiment, tree selector 222 then causes network device 201 to advertise the elected tree type in a BIER-PE-BMP packet, described in further details below.

In one embodiment, D-BFR controller 211 further includes BMP assignor 221 configured to assign BMPs to the BFERs<T,S>. BMP assignment may be initiated by any of various events, including but not limited to, a BFER requesting for a BMP by sending a BIER-PI TLV packet.

FIG. 4 is a block diagram illustrating BIER-PI TLV packet 400 according to one embodiment. The information/elements shown as part of BIER-PI TLV packet 400 are for illustrative purposes, and are not intended to be limitations of the present invention.

According to one embodiment, BIER-PI TLV packet 400 is implemented as an OSPFv2 Extended Prefix Opaque LSA, which is described in IETF I-D draft-ietf-ospf-prefix-link-attr-00. BIER-PE-BMP packet 400 is advertised/distributed by the participating BFERs. BIER-PI TLV packet 400 includes, but is not limited to, the following fields:

| Field | Definition |
| --- | --- |
| Type | A predefined value identifying the packet as a BIER-PI TLV. |
| Length | The total length of the packet. |
| Encapsulation Type | The BIER encapsulation type. |
| MT-ID | Multi-Topology Identifier, described in IETF RFC 4915 (herein incorporated by reference). |
| Set ID | The set identifier. |
| Label | Label used on encapsulation for this set (20 bits). MUST be a valid label assigned by the BFR. |
| Admin BMP | Set to invalid BMP (e.g., all 1's) or an administratively requested BMP. |
| A | When this bit is set, the BFER advertises that the value indicated in the Admin BMP field is the preferred position per administrative configuration. |
| R | When this bit is set, the BFER indicates that it is willing to accept a BMP other than the one administratively set in the Admin BMP field. |

Referring now back to FIG. 2, BMP assignor 221, in one embodiment, is configured to maintain BMP information (e.g., a BMP database containing the information) of which BMPs have been assigned. BMP assignor 221 determines whether the received BIER-PI TLV indicates a preferred BMP (e.g., by checking if field "A" in the received BIER-PI TLV is set). If so, BMP assignor 221 determines whether the BMP information indicates the preferred BMP is available for assignment (i.e., not previously assigned to a BFER). In response to determining the preferred BMP is available, BMP assignor 221 assigns the preferred BMP to the requesting BFER. If the preferred BMP is not available, BMP assignor 221 determines whether the requesting BFR is willing to accept a different BMP than the preferred BMP (e.g., by checking if field "R" in the received BIER-PI TLV is set). If so, BMP assignor 221 assigns the requesting BFER an available (i.e., unassigned) BMP that is different from the preferred BMP. In the event that the requesting BFER indicates a preferred BMP, and an unwillingness to accept a different available (i.e., unassigned) BMP (e.g., field "A" is set, but field "R" is not set), BMP assignor 221 returns an error to the requesting BFER indicating BMP collision.

According to one embodiment, in response to determining the BIER-PI TLV does not indicate a preferred BMP, BMP assignor 221 simply assigns the requesting BFER any available BMP, e.g., from a BMP database. In all cases, if the BMP information indicates there is no available BMP, BMP assignor 221 returns an error to the requesting BFER indicating there is no available BMP. BMP assignor 221 updates the BMP information after each BMP assignment in order to avoid assigning the same BMP to multiple BFERs. According to one embodiment, BMP assignor 221 then causes network device 201 to advertise the assigned BMP in a BIER-PE-BMP packet.

In response to an election of a new BM length, an election of a tree type, and/or an assignment of one or more BMPs, network device 201 advertises the information by sending a BIER-PE-BMP packet.

FIG. 5 is a block diagram illustrating BIER-PE-BMP packet 500 according to one embodiment. The information/elements shown as part of BIER-PE-BMP packet 500 are for illustrative purposes, and not are intended to be limitations of the present invention.

According to one embodiment, BIER-PE-BMP packet 500 is implemented as an OSPFv2 opaque LSA, which is described in IETF RFC 5250. BIER-PE-BMP packet 500 is advertised/distributed by the elected D-BFR<T,S> and contains one or more of the BMP assignment blocks illustrated in FIG. 5. The BMP assignment block is repeated for each BMP assignment. BIER-PE-BMP packet 500 includes, but is not limited to, the following fields:

| Field | Definition |
| --- | --- |
| Type | A predefined value identifying the packet as a BIER-PE-BMP. |
| Length | The total length of the packet. |
| MT-ID | Multi-Topology Identifier, described in IETF RFC 4915 (herein incorporated by reference). |
| Set ID | The set identifier. |
| Tree ID | The elected tree type identifier.<br>0: Shortest Path First (SPF) - supported by all BFRs. Every BFR computes an SPF tree with itself as the root, and uses this tree to construct the bit index forwarding table (BIFT).<br>1: Shortest Spanning Tree (SST) - supported by all BFRs. Every BFR computes a Steiner tree spanning all BFERs in the set (i.e., BFRs with a valid BMP assignment).<br>2-6: Optional tree types 1-5.<br>7: Reserved. |

-continued

| Field | Definition |
|---|---|
| Elected BM Length | The elected length of the BM. |
| # BMP Assignments | The number of BMP assignment blocks that are repeated in this packet. |
| Route Type/AF/ Prefix Length | Unique identifier for the prefix for which the BMP has been assigned. |
| Status | 0: BMP assignment is valid.<br>1: ERROR: BMP collision.<br>2: ERROR: Out of BMPs |
| BMP Assignment | The BMP assigned to the BFER identified by the BFER ID. This field is set to an invalid BMP (e.g., all 1's) when there is an assignment error. |
| Address Prefix | The prefix associated with the BFER. |
| BFER ID | The router ID of the BFER for which the BMP has been assigned. |

Referring now back to FIG. 2, according to one embodiment, in response to determining that network device 201 is the elected BD-BFR<T,S>, election controller 210 enables BD-BFR controller 212 to perform BD-BFR responsibilities. BD-BFR controller 212 may be implemented as software, firmware, hardware, or any combination thereof. In one embodiment, BD-BFR controller 212 is configured to mirror in its advertisements the exact state of the elected D-BFR<T,S> and on each received advertisement, and maintains its internal states to use as starting point in all D-BFR<T,S> procedures in case network device 201 loses connectivity to the D-BFR<T,S>.

A new BFR desiring to participate in a set <T,S> by advertising its BIER-PE must be disregarded by all members in their tree type computations for <T,S> when:
 its maximum supported BM length is shorter than the elected BM length,
 it is not capable of computing the elected tree type, or
 it is not capable of allocating (at least temporarily) a valid encapsulation label to support the forwarding of BIER traffic on <T,S>.

Thus, if a D-BFR has already been elected, a router that does not meet the above conditions for <T,S> should not advertise its BIER-PE. The router may, however, advertise such a BIER-PE to allow the D-BFR to elect a shorter BM to prevent partitioning of the tree spanning all receivers.

Each BFR<T,S> carries in its BIER-PI TLV the request for a BMP. In the case where the BFR<T,S> is also a BFER<T,S>, the BIER-PI TLV also includes a label assigned for encapsulation of the set S when forwarding BIER traffic. Due to optimizations, resource constraints, or other criteria, a router may not be able to assign such a label in <T,S>. If that is the case, the router must not advertise its BIER-PI TLV for the <T,S>. All routers computing the tree type for <T,S> will, therefore, exclude it from computation. If the router advertises a label for <T,S>, all routers computing the tree type for <T,S> must re-compute their Bit Index Forwarding Table (BIFT) for <T,S>.

As a point of special consideration, it should be observed here that a router may intentionally not advertise a label or purge its BIER-PI TLV for the <T,S> if it determines that no traffic will be forwarded through it and, therefore, the label space can be conserved.

Figure 6:
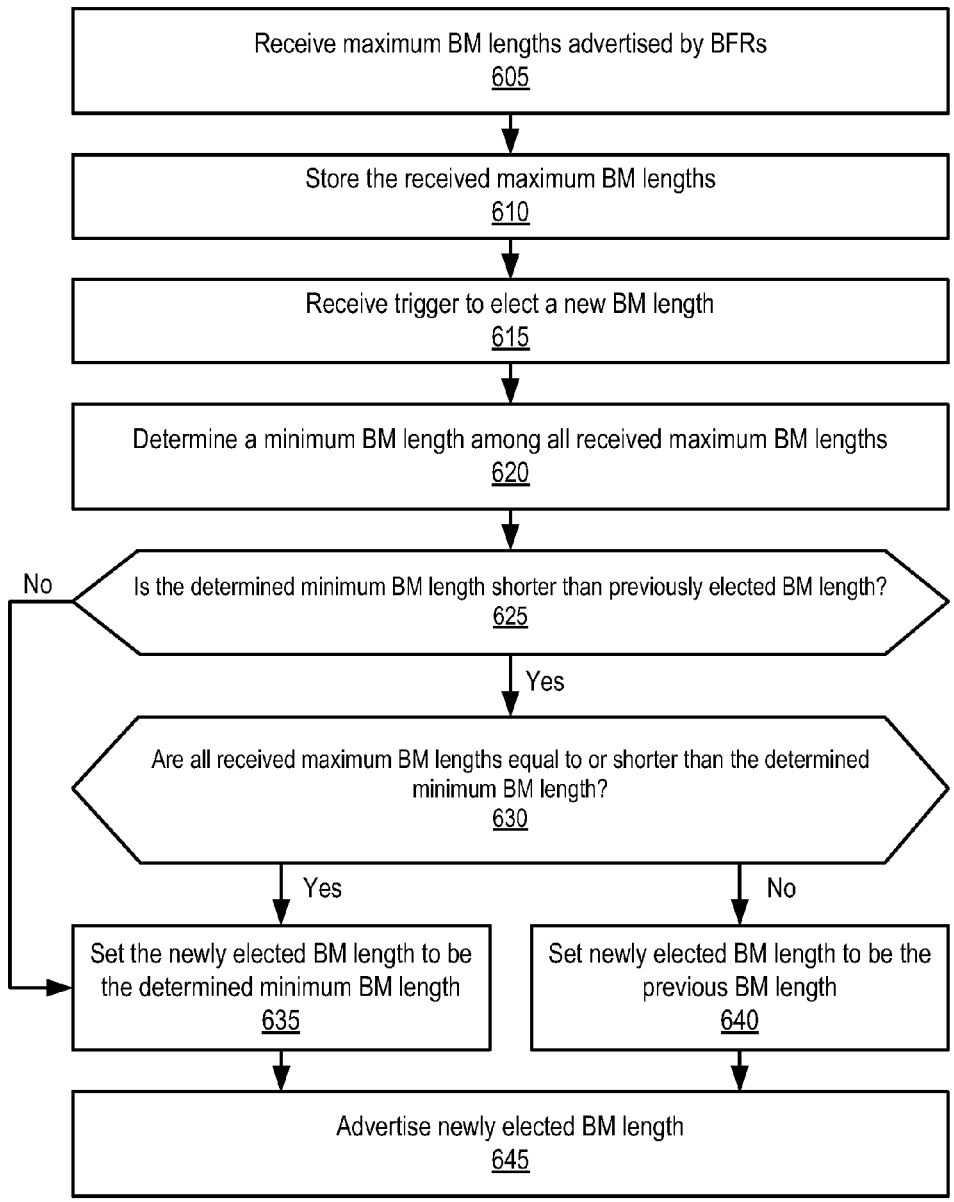
FIG. 6 is a flow diagram illustrating a method for electing a BM length according to one embodiment.

FIG. 6 is a flow diagram illustrating method 600 for electing a BM length. For example, method 600 can be performed by BM length selector 220. Method 600 can be implemented in software, firmware, hardware, or any combination thereof. The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Referring now to FIG. 6. At block 605, a BM length selector receives maximum BM lengths advertised by BFRs (e.g., in BIER-PE packets). At block 610, the BM length selector stores the received maximum BM lengths in a storage device. At block 615, the BM length selector receives a trigger to elect a new BM length. The trigger may be, for example, the reception of a BIER-PE packet, a request set by an administrator, etc. At block 620, the BM length selector determines a minimum BM length among all received maximum BM lengths.

At block 625, the BM length selector determines whether the determined minimum BM length is shorter than the previously elected BM length (i.e., the current BM length). If not, the BM length selector transitions to block 635 and sets the newly elected BM length to be the determined minimum BM length. At block 645, the BM length selector advertises the newly elected BM length (e.g., by sending a BIER-PE-BMP packet).

Returning now back to block 625. In response to determining the determined minimum BM length is shorter than the previously elected BM length, the BM length selector transitions to block 630. At block 630, the BM length selector determines whether all received maximum BM lengths are equal to or shorter than the determined minimum BM length. If so, the BM length selector transitions to block 635. If, however, not all received maximum BM lengths are equal to or shorter than the determined minimum BM length, the BM length selector transitions to block 640 and sets the newly elected BM length to be the previously elected BM length (i.e., retains the current BM length). It is to be noted that the BM length selector may also elect a new BM length regardless of whether it is shorter than the previously elected BM length if the BM length selector determines that the resulting tree is partitioned and not all BFERs with assigned BMPs can be reached unless the BFRs with the shorter BM length are included in the election. For example, in response to determining that not all BFERs with assigned BMPs can be reached if the BFR(s) with shorter maximum BM lengths are not included in the election, the BM length selector will, in one embodiment, include the BFR(s) with shorter maximum BM lengths in the election, and set the newly elected BM length to be the shorter maximum BM length (e.g., by performing the operations of block 635). This can be done before or after performing the operations of block 620 to determine the new minimum BM length.

Figure 7:
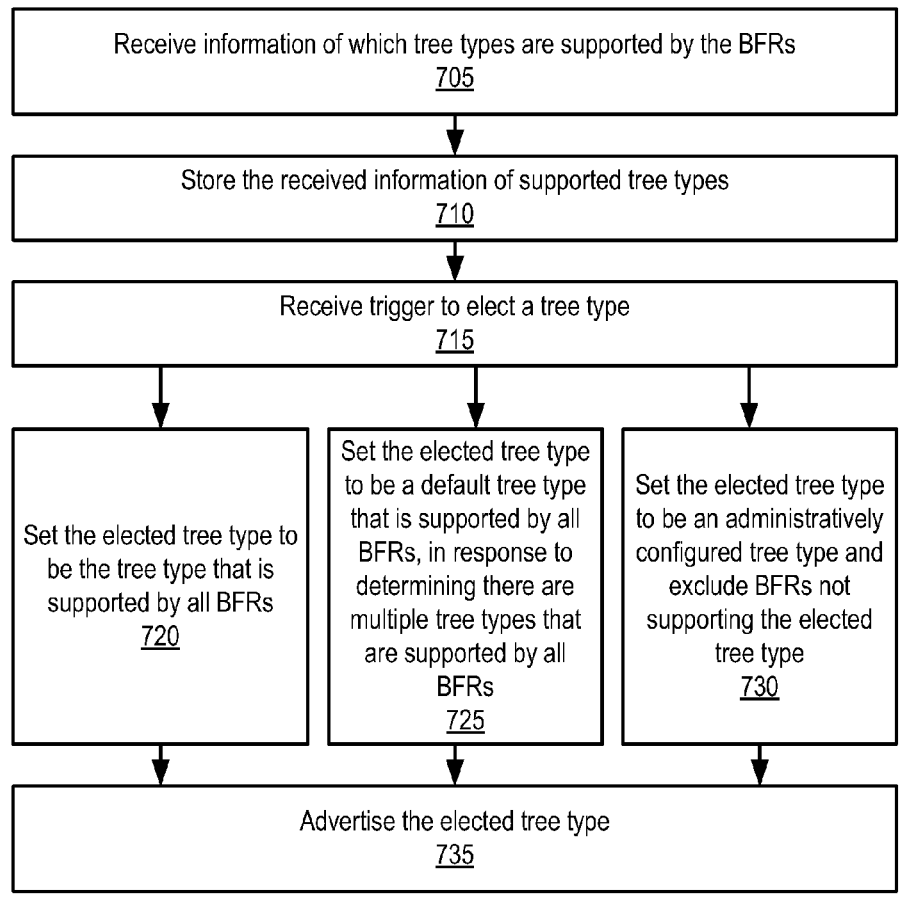
FIG. 7 is a flow diagram illustrating a method for electing a tree type according to one embodiment.

FIG. 7 is a flow diagram illustrating method 700 for electing a tree type. For example, method 700 can be performed by tree selector 222. Method 700 can be implemented in software, firmware, hardware, or any combination thereof. Referring now to FIG. 7. At block 705, a tree selector receives information of which tree types are supported by the BFRs (e.g., as part of received BIER-PE packets). At block 710, the tree selector stores the received information of the supported tree types in a storage device. At block 715, the tree selector receives a trigger to elect a tree type. The trigger can be, for example, the reception of a BIER-PE packet, a request initiated by an administrator, etc.

At block 720, the tree selector sets the elected tree type to be a tree type that is supported by all BFRs. At block 725, the tree selector, in response to determining there are multiple tree types that can be supported by all the BFRs, sets the elected tree type to be an administratively configured tree type that is supported by all BFRs. At block 730, the tree selector sets the elected tree type to be an administratively configured tree type and excludes BFRs that do not support the elected tree type. Block 730 may be performed, for example, in response to the tree selector determining that not all BFRs support an optional tree type, but the tree selector nevertheless needs to select the tree type even though it will result in some BFRs being excluded from the BIER network. At block 735, the tree selector advertises the elected tree type (e.g., by sending a BIER-PE-BMP packet).

Figure 8:
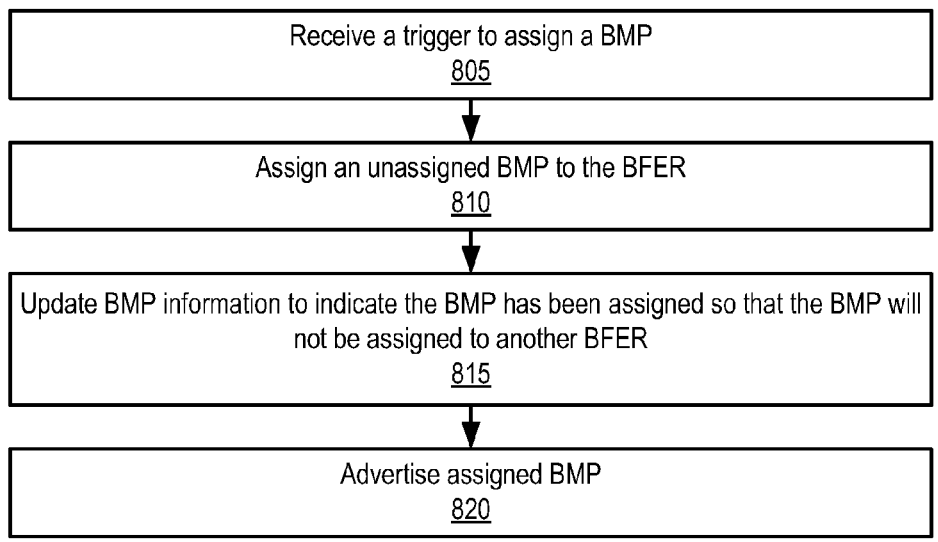
FIG. 8 is a flow diagram illustrating a method for assigning a BMP according to one embodiment.

FIG. 8 is a flow diagram illustrating method 800 for assigning a BMP. For example, method 800 can be performed by BMP assignor 221. Method 800 can be implemented in software, firmware, hardware, or any combination thereof. Referring now to FIG. 8. At block 805, a BMP assignor receives a trigger to assign a BMP. The trigger can be the reception of a BIER-PE packet, a BIER-PI TLV packet, a request initiated by an administrator, etc.

At block 810, the BMP assignor assigns an unassigned (i.e., available) BMP to the BFER. The BMP assigned depends on whether the requesting BFER indicated in its BIER-PI TLV a preferred BMP, its willingness to accept another BMP in the event that the preferred BMP is not available, etc. For example, if the requesting BFER does not indicate a preferred BMP, the BMP assignor selects any available/unassigned BMP and assigns it to the BFER. If the requesting BFER indicates a preferred BMP, and the BMP is available, the BMP assignor assigns the preferred BMP to the requesting BFER. If, however, the preferred BMP is not available, and the requesting BFER indicates a willingness to accept another BMP, the BMP assignor assigns another available BMP to the BFER. On the other hand, if the preferred BMP is not available, and the requesting BFER indicates an unwillingness to accept another BMP, the BMP assignor returns an error status to the BFER indicating collision. In all cases, if there are no available BMPs, the BMP assignor returns an error to the BFER indicating there is no available BMP.

At block 815, the BMP assignor updates BMP information (e.g., stored in a database) to indicate the BMP has been assigned so that the same BMP will not be assigned to another BFER. At block 820, the BMP assignor advertises the assigned BMP (e.g., by sending a BIER-PE-BMP packet).

Figure 9A:
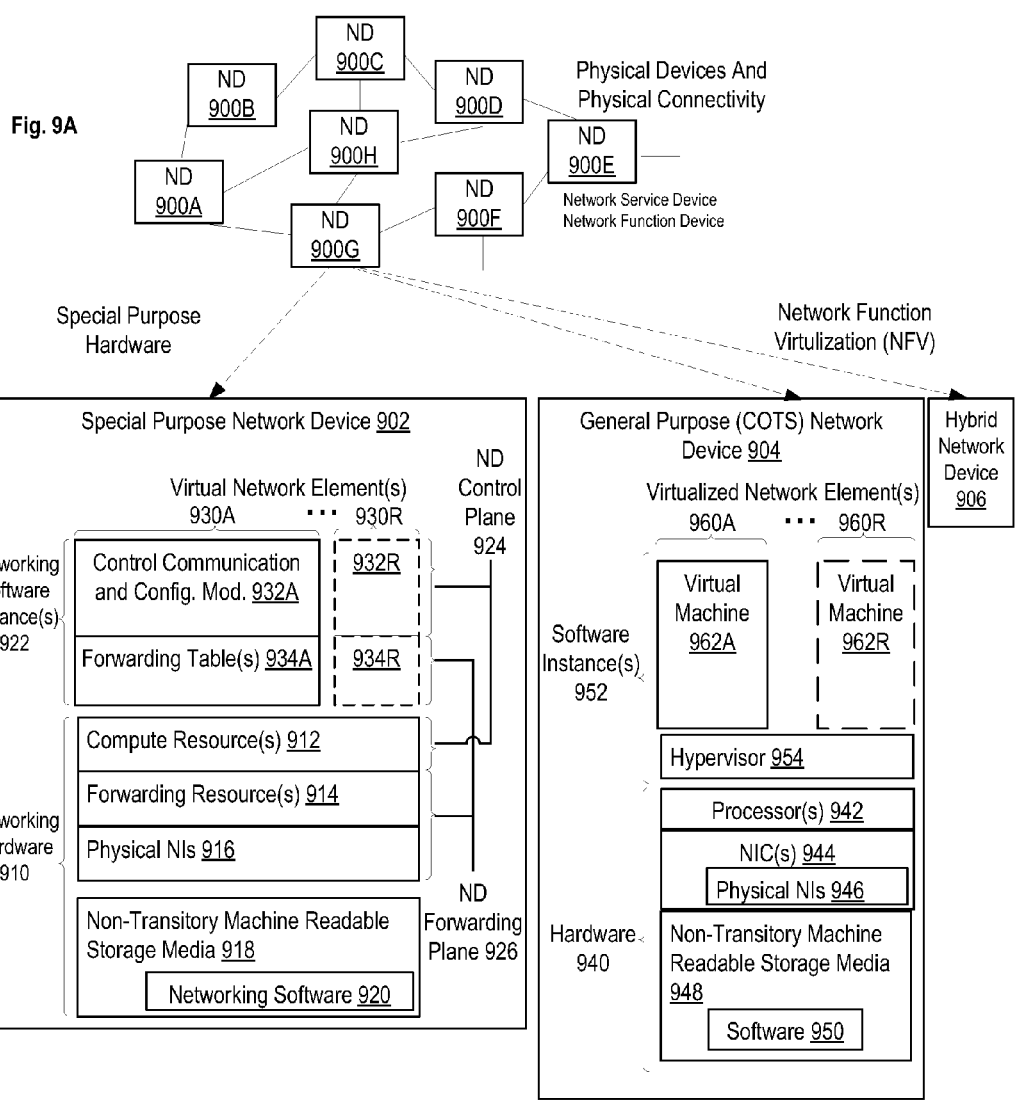
FIG. 9A illustrates connectivity between network devices (NDs) within an exemplary network, as well as three exemplary implementations of the NDs, according to some embodiments of the invention.

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 900A, E, and F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a proprietary operating system (OS); and 2) a general purpose network device 904 that uses common off-the-shelf (COTS) processors and a standard OS.

The special-purpose network device 902 includes networking hardware 910 comprising compute resource(s) 912 (which typically include a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software 920. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-H. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

Software 920 can include code which be executed by networking hardware 910, cause networking hardware 910 to perform operations of one or more embodiments of the present invention as part networking software instances 922.

The special-purpose network device 902 is often physically and/or logically considered to include: 1) a ND control plane 924 (sometimes referred to as a control plane) comprising the compute resource(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the compute resource(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

Figure 9B:
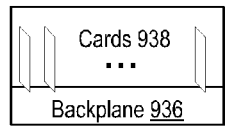
FIG. 9B illustrates an exemplary way to implement the special-purpose network device 902 according to some embodiments of the invention.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein software 950. During operation, the processor(s) 942 execute the software 950 to instantiate a hypervisor 954 (sometimes referred to as a virtual machine monitor (VMM)) and one or more virtual machines 962A-R that are run by the hypervisor 954, which are collectively referred to as software instance(s) 952. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 962A-R, and that part of the hardware 940 that executes that virtual machine (be it hardware dedicated to that virtual machine and/or time slices of hardware temporally shared by that virtual machine with others of the virtual machine(s) 962A-R), forms a separate virtual network element(s) 960A-R.

The virtual network element(s) 960A-R perform similar functionality to the virtual network element(s) 930A-R. For instance, the hypervisor 954 may present a virtual operating platform that appears like networking hardware 910 to virtual machine 962A, and the virtual machine 962A may be used to implement functionality similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 962A-R differently. For example, while embodiments of the invention are illustrated with each virtual machine 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 954 includes a virtual switch that provides similar forwarding services as a physical Ethernet switch. Specifically, this virtual switch forwards traffic between virtual machines and the NIC(s) 944, as well as optionally between the virtual machines 962A-R; in addition, this virtual switch may enforce network isolation between the VNEs 960A-R that by policy are not permitted to communicate with each other (e.g., by honoring virtual local area networks (VLANs)).

Software 950 can include code which be executed by processor(s) 942, cause processor(s) 942 to perform operations of one or more embodiments of the present invention as part virtual machine 962A-R.

The third exemplary ND implementation in FIG. 9A is a hybrid network device 906, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a first network device that is communicatively coupled to a plurality of other network devices in a network, wherein the first network device and each of the other network devices are bit forwarding routers (BFRs) that support Bit Index Explicit Replication (BIER) protocol, and wherein the first network device is elected to be a designated BFR (D-BFR), the method comprising:
   receiving a trigger to elect a bitmask (BM) length;
   determining the elected BM length of a BM based on maximum local BM lengths advertised by other BFRs in the network, wherein the BM comprises a plurality of bits and each bit of the BM will correspond to a bit forwarding egress router (BFER); and
   advertising the determined elected BM length to the other BFRs.

2. The method of claim 1, wherein determining the elected BM length comprises:
   receiving one or more messages from one or more of the other BFRs, each of the one or more received messages including a maximum BM length supported by a BFR that sent that message;
   determining a minimum BM length of all the maximum BM lengths included in the one or more received messages; and
   in response to determining the minimum BM length is not shorter than a previously elected BM length, setting the elected BM length to be equal to the determined minimum BM length.

3. The method of claim 1, wherein determining the elected BM length comprises:
   receiving one or more messages from one or more of the other BFRs, each of the one or more received messages including a maximum BM length supported by a BFR that sent that message;
   determining a minimum BM length of all the maximum BM lengths included in the one or more received messages; and
   in response to determining the minimum BM length is shorter than a previously elected BM length, setting the elected BM length to be equal to the previously elected BM length.

4. A first network device that is communicatively coupled to a plurality of other network devices in a network, wherein the first network device and each of the other network devices are bit forwarding routers (BFRs) that support Bit Index Explicit Replication (BIER) protocol, and wherein the first network device is to be elected to be a designated BFR (D-BFR), the first network device comprising:
   a set of one or more processors; and
   a non-transitory machine-readable storage medium containing code, which when executed by the set of one or more processors, cause the first network device to:
   receive a trigger to elect a bitmask (BM) length,
   determine the elected BM length of a BM based on maximum local BM lengths advertised by other BFRs in the network, wherein the BM comprises a plurality of bits and each bit of the BM will correspond to a bit forwarding egress router (BFER), and
   advertise the determined elected BM length to the other BFRs.

5. The first network device of claim 4, wherein the code, when executed by the set of one or more processors, causes the first network device to determine the elected BM length by causing the first network device to:
   receive one or more messages from one or more of the other BFRs, each of the one or more received messages including a maximum BM length supported by a BFR that sent that message;
   determine a minimum BM length of all the maximum BM lengths included in the one or more received messages; and
   in response to determining the minimum BM length is not shorter than a previously elected BM length, set the elected BM length to be equal to the determined minimum BM length.

6. The first network device of claim 4, wherein the code, when executed by the set of one or more processors, causes the first network device to determine the elected BM length by causing the first network device to:
receive one or more messages from one or more of the other BFRs, each of the one or more received messages including a maximum BM length supported by a BFR that sent that message;
determine a minimum BM length of all the maximum BM lengths included in the one or more received messages; and
in response to determining the minimum BM length is shorter than a previously elected BM length, set the elected BM length to be equal to the previously elected BM length.

7. A non-transitory computer-readable storage medium having computer code stored therein, which when executed by a processor of a first network device that is communicatively coupled to a plurality of other network devices in a network, wherein the first network device and each of the other network devices are bit forwarding routers (BFRs) that support Bit Index Explicit Replication (BIER) protocol, and wherein the first network device is to be elected to be a designated BFR (D-BFR), cause the first network device to perform operations comprising:
receiving a trigger to elect a bitmask (BM) length;
determining the elected BM length of a BM based on maximum local BM lengths advertised by other BFRs in the network, wherein the BM comprises a plurality of bits and each bit of the BM will correspond to a bit forwarding egress router (BFER); and
advertising the determined elected BM length to the other BFRs.

8. The non-transitory computer-readable storage medium of claim 7, wherein the operation of determining the elected BM length comprises:
receiving one or more messages from one or more of the other BFRs, each of the one or more received messages including a maximum BM length supported by a BFR that sent that message;
determining a minimum BM length of all the maximum BM lengths included in the one or more received messages; and
in response to determining the minimum BM length is not shorter than a previously elected BM length, setting the elected BM length to be equal to the determined minimum BM length.

9. The non-transitory computer-readable storage medium of claim 7, wherein the operation of determining the elected BM length comprises:
receiving one or more messages from one or more of the other BFRs, each of the one or more received messages including a maximum BM length supported by a BFR that sent that message;
determining a minimum BM length of all the maximum BM lengths included in the one or more received messages; and
in response to determining the minimum BM length is shorter than a previously elected BM length, setting the elected BM length to be equal to the previously elected BM length.

\* \* \* \* \*